United States Patent [19]

Byrne et al.

[11] Patent Number: 4,700,304

[45] Date of Patent: Oct. 13, 1987

[54] ELECTRONIC CONTROL UNIT FOR AN ANTI-SKID BRAKING SYSTEM

[75] Inventors: Peter C. Byrne; Gerard McCann, both of Dublin, Ireland

[73] Assignee: PCB Controls Public Limited Company, Blackrock, Ireland

[21] Appl. No.: 684,798

[22] Filed: Dec. 21, 1984

[51] Int. Cl.⁴ .............................................. B60T 8/00
[52] U.S. Cl. ...................................... 364/426; 303/92
[58] Field of Search ................. 364/426, 551; 303/92, 303/95, 96; 180/197; 361/238; 370/3, 20, 23, 25

[56] References Cited

U.S. PATENT DOCUMENTS

| | | | |
|---|---|---|---|
| 4,106,821 | 8/1978 | Brearley | 303/96 |
| 4,321,677 | 3/1982 | Takahashi et al. | 364/426 |
| 4,340,935 | 7/1982 | Anlauf et al. | 303/92 |
| 4,361,871 | 11/1982 | Miller et al. | 303/92 |
| 4,546,437 | 10/1985 | Bleckmann et al. | 303/92 |

FOREIGN PATENT DOCUMENTS

| | | | |
|---|---|---|---|
| 0021942 | 2/1981 | Japan | 364/426 |
| 2112234 | 7/1983 | United Kingdom | 364/426 |
| 2120428 | 11/1983 | United Kingdom . | |
| 2129587 | 5/1984 | United Kingdom . | |

Primary Examiner—Parshotam S. Lall
Attorney, Agent, or Firm—Roylance, Abrams, Berdo & Goodman

[57] ABSTRACT

A microcomputer based electronic control unit for an anti-skid braking system includes monitoring means for testing the correct operation of the anti-skid braking system, including the electronic control unit. The disabling means includes microcomputer resetting means which in the event of program execution falling out of synchronization resets the microcomputer. The monitoring means test whether or not the wheel speed sensors are short circuited or disconnected. The unit also includes a load dump protection function, an electromagnetic interference suppression circuit and a warning light drive which may additionally be used to output diagnostic information.

15 Claims, 14 Drawing Figures

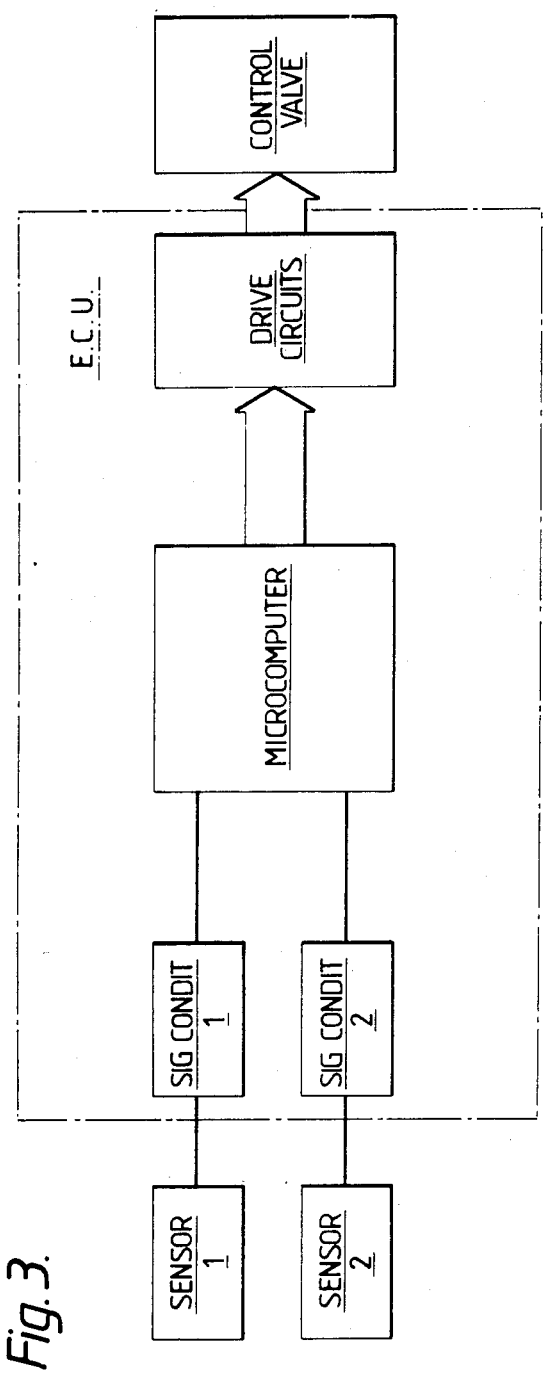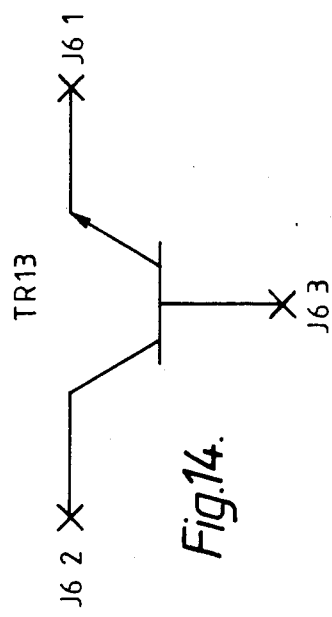

ELECTRONIC CONTROL UNIT FOR AN ANTI-SKID BRAKING SYSTEM

FIELD OF THE INVENTION

The invention relates to an electronic control unit (ECU) for vehicle anti-skid braking systems and in particular to a microcomputer based ECU.

RELEVANT BACKGROUND AND PRIOR ART

A generalised anti-skid system is shown in FIG. 1 of the accompanying drawings. A sensor 10 is used to detect acceleration or deceleration of the wheel 20. The sensed information is passed to an electronic control unit 30 which in turn regulates the control valve 40 which controls the required wheel braking. If the wheel deceleration exceeds that which is physically possible for the vehicle, then the ECU 30 signals the control valve 40 to reduce fluid pressure to the brakes on the wheel 20. As the wheel 20 accelerates back towards the vehicle's speed the braking pressure is increased again. The cycle is repeated for the period during which input fluid pressure to the brakes would cause the wheel 20 to lock without the anti skid system. One or more wheels of the vehicle may be sensed and the brakes of one or more wheels may be controlled. Furthermore the number of controlled wheels need not equal the number of sensed wheels. The control valve 40 may have a number of different states, e.g. pressure reduction, pressure hold, slow pressure increase, rapid pressure increase (normal braking), etc.

The design of an ECU is dictated by a number of requirements. One requirement is that the control strategy of an ECU must give very good performance under almost all possible road conditions. As a rough guide, the stopping distance on a vehicle having an anti-skid system should be no worse than that of a locked wheel stop. Legal requirements apply in some countries with regard to this requirement. Secondly, an ECU must be failsafe to a very high degree, i.e. in the perfect example a system failure of any kind must, at worst, restore normal braking to the vehicle. A third requirement is that if there occurs external to an ECU an electrical failure which affects the system, the driver of the vehicle to which the anti-skid system is fitted must be alerted by some means. Usually a warning light is fitted for this purpose. Examples of external failures are disconnected sensors or disconnected solenoids which form part of the control valve. Fourthly, the driver of the vehicle must be informed if a failure occurs within the ECU itself. A further requirement is that the ECU must be highly resistant to electromagnetic interference. Again legal requirements apply in some countries with regard to this requirement.

Early ECU's for anti-skid systems were based on analogue electronic techniques. Arrangements of frequency to voltage converters, ramp generators, comparators, differentiators, etc. were used to establish brake control decisions. More recent designs have been based on custom digital integrated circuits, while the latest designs tend to be microcomputer based.

Microcomputer based electronic control units can have as complex a control cycle as is required for optimum performance. Present and anticipated legislative requirements may be met with such an ECU. Temperature variations do not present a problem, as suitable microcomputers may be used which can operate within the required temperature range of $-40°$ C. to $85°$ C. Significant adaptability can now be achieved limited only by the read/write (RAM) memory size and software designer ingenuity. Thus, good performance can be achieved for practically all possible road conditions. A significant advantage in microcomputer based systems is that variations in the control strategy are easily implemented in the product development phase. This results in reduced product development time and/or a more optimised control strategy in the final product.

Using a microcomputer based ECU, it is possible to obtain a very good failsafe capability. The microcomputer may itself be duplicated and comparisons made between the two sets of control decisions. If a discrepency arises, the system is shut down by independent hardware. Such a system is very reliable but is somewhat expensive.

With a microcomputer based ECU, there is no difficulty in meeting the external electrical failure requirement. Due to the multifunctional nature of a microcomputer, the main operating hardware may be largely utilised for this function.

Total duplication in a microcomputer based ECU can give fault determination capability.

Microcomputer based ECU's, because of logic level noise immunity, tend to be totally resistant to moderate levels of electromagnetic interference. Under extreme conditions, however, a bit error may lead to complete loss of direction in program execution. When this occurs the system usually does not resume normal operation even when interference is removed.

SUMMARY OF THE INVENTION

The present invention provides an electronic control unit for an anti-skid braking system comprising a microcomputer having the necessary circuitry and being programmed to enable control decisions for the valve means of the anti-skid braking system to be determined; signal conditioning means for applying to the microcomputer signals generated from wheel speed sensing means of the anti-skid braking system; drive means for activating the valve means in response to the control decisions of the microcomputer; monitoring means for testing the correct operation of the anti-skid braking system, including the electronic control unit, and disabling means activated by the monitoring means for disabling the anti-skid braking system, the electronic control unit including microcomputer resetting means which operates in conjunction with the disabling means to reset the microcomputer in the event of program execution falling out of synchronisation prior to the disabling means being operated.

Advantageously, the monitoring means includes test circuitry between the signal conditioning means and the microcomputer, and between the microcomputer and the drive means with the microcomputer being programmed to implement a self check procedure.

Preferably, the disabling means comprises a failsafe means including a fuse and which during operation of the electronic control unit is continuously disposed to blow the fuse so as to prevent operation of the anti-skid braking system, the failsafe means being pulsed periodically by the microcomputer so as to prevent the fuse from blowing, whereby on detection of a fault by the monitoring means the pulsing is stopped, the microcomputer resetting means is activated and the fuse is blown if the pulsing of the failsafe means does not recommence within a set time.

Conveniently, the failsafe means includes (1) a capacitor which is continuously discharged by pulses from the microcomputer, the pulses being within a range of design frequencies and (2) a band pass filter for preventing pulses of other frequencies from discharging the capacitor.

Advantageously, the monitoring means includes a comparator associated with the signal conditioning means; the comparator, when pulsed alternately from a source corresponding to each of two sensor leads and then simultaneously from both sources, can inform the microcomputer whether any of said sensors are disconnected or short circuited.

The E.C.U. also includes load dump protection means which protect the unit from large electrical transient pulses and the like which may suddenly be introduced into the electrical supply of the unit, means for suppressing electromagnetic interference and a warning light drive which may additionally be used to ouput diagnostic information for indicating the type of fault which may exist in the anti-skid braking system.

BRIEF DESCRIPTION OF THE DRAWINGS

The invention will hereinafter be more particularly described with reference to the accompanying drawings, which illustrate, by way of example only, one embodiment according to the invention.

In the drawings:

FIG. 1 is a schematic view of a generalised anti-skid braking system previously referred to;

FIG. 3 is a logic block diagram of an electronic control unit according to the invention incorporated in an anti-skid braking system;

FIG. 14 is a schematic view of an auxiliary electronics board of the electronic control unit.

DESCRIPTION OF THE PREFERRED EMBODIMENT

Figure 1:
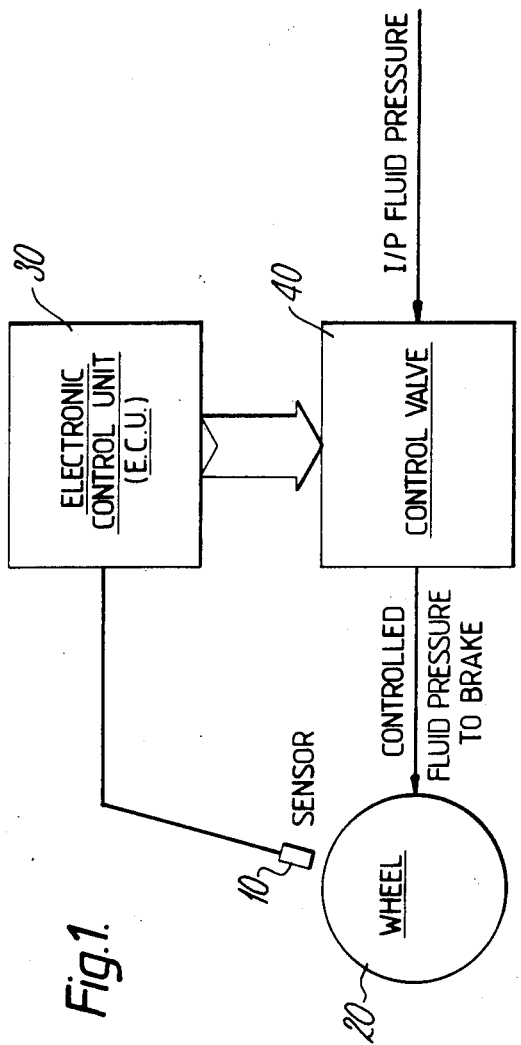

Referring to the drawings and initially to FIG. 1, each sensor 10 is a magnetic reluctance transducer which is situated near an exciting ring (not shown) which rotates with the wheel 20. The exciting ring is made of a low reluctance material and has a given number of teeth. As the wheel 20 rotates, the sensor 10 detects the variation in reluctance and outputs an alternating voltage. The frequency of the alternating voltage corresponds directly to the rate at which the teeth pass the sensor face. The embodiment will be described with reference to the use of two sensors thus this particular system would be appropriate for sensing from and controlling one particular axle. Different numbers of wheels and axles may be sensed and controlled using the invention.

Figure 2:
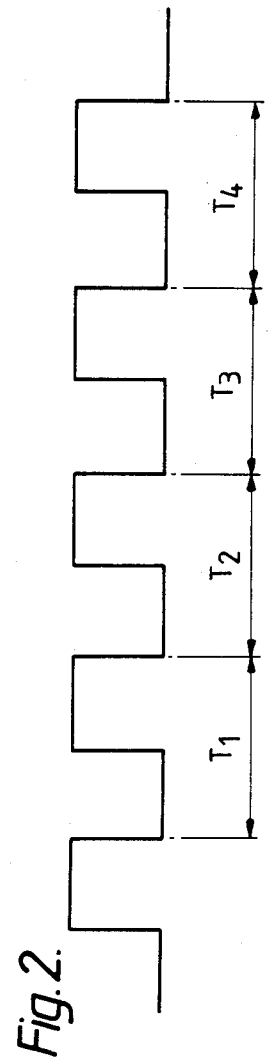
FIG. 2 is a square wave corresponding to the output of a wheel speed sensor.

Signal conditioning circuits reject noise to some degree and convert the alternating voltages from the sensors into square waves (FIG. 2). These are then applied to the microcomputer. By timing between edges of the square waves the microcomputer generates the period of the wave form corresponding to a particular wheel. In the specific embodiment described the microcomputer times between negative (falling) edges as shown in FIG. 2. From the data obtained the microcomputer computes wheel speed and acceleration. Using this information the microcomputer can now determine what control decisions it should implement, i.e. whether to reduce braking level, hold braking level, increase braking level slowly or increase braking level quickly.

The interface between the micrcomputer and the solenoids (not shown) of the control valve 40 is via the drive circuits block as shown in FIG. 3. This block consists of suitably rated transistors to supply the currents required by the valve solenoids.

Figure 4:
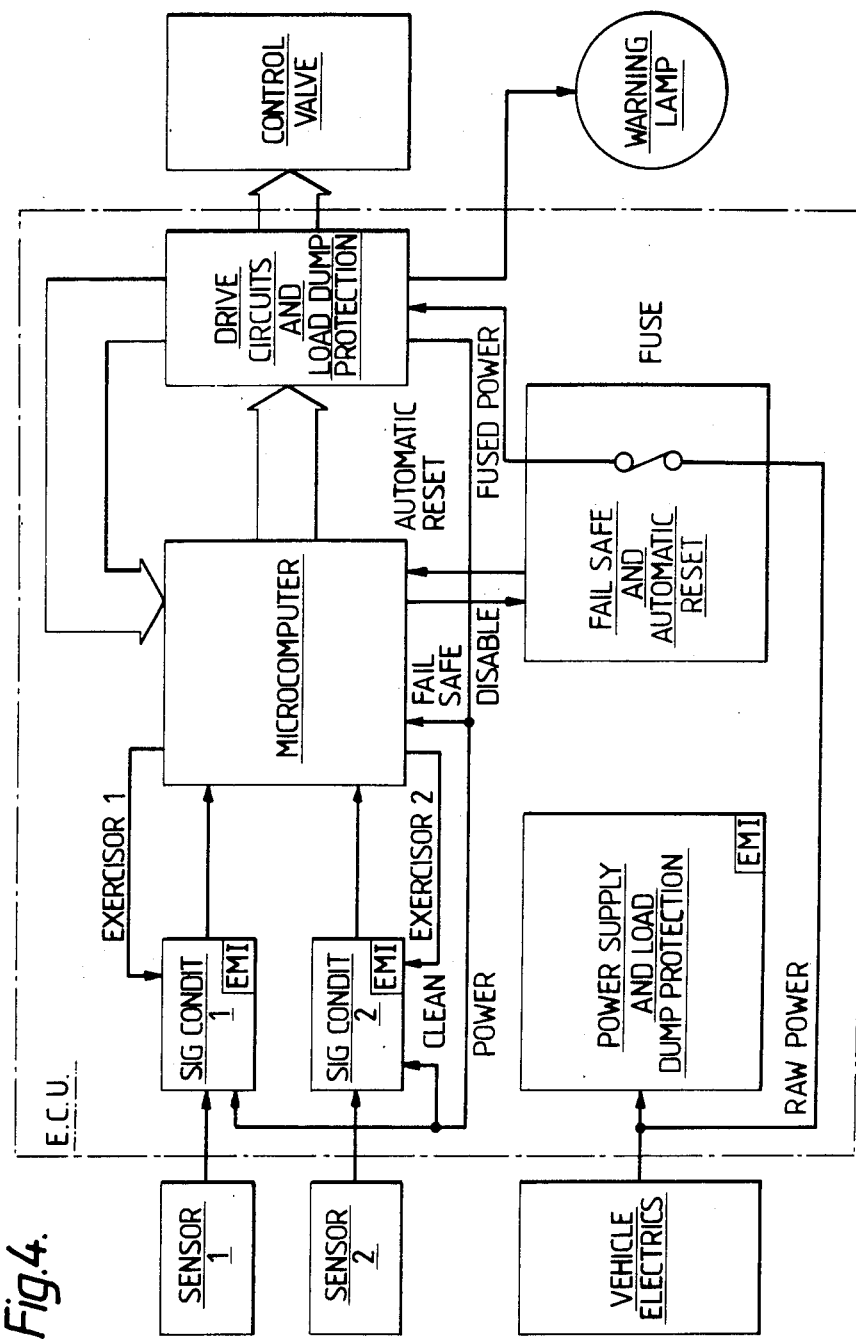
FIG. 4 is an expanded schematic view of the electronic control unit and anti-skid braking system.

The expanded system is shown in FIG. 4. Electrical power to drive the ECU is obtained from the vehicle electric system. In the case of an air braked heavy goods vehicle, the usual electric system voltage is twenty-four volts (24 V). The particular implementation to be described is for such vehicles. The input from the vehicle electrical system is shown as "raw power" in FIG. 4. This input is reduced to a lower operating voltage for the signal conditioning circuits, the microcomputer and the drive circuits. The lower operating voltage is shown as "clean power".

The ECU includes a power supply block and a drive circuit block both of which contain a "load dump" protection function. Load dump is a phenomonen which occurs when a heavy load, e.g. a flat battery, under charge, is suddenly disconnected from the system. Because of the alternator self inductance a large voltage transient may then result which may be over 100 V and last for hundreds of milliseconds.

The signal conditioning circuits also include self test circuitry which test for correct operation and also check that the sensors are not disconnected or short circuited. The self test circuits are actuated by the microcomputer. The main operating circuitry is used as far as possible for the self check function also. The main operating transistors of the drive circuit block are also used to implement the self test feature and to check that the solenoids are properly connected. A simple monitoring circuit is also required to feed the information back to the microcomputer.

The microcomputer also checks itself. It verifies all program memory using the standard check sum technique and verifies random access memory (RAM) by writing and reading various bit patterns to and from RAM. These test routines also verify the data paths and instruction decoding logic within the microcomputer. In addition the various input/output ports are checked as part of the peripheral cicuitry tests which the microcomputer implements. Stimuli from the peripheral circuits exit from the microcomputer through the various port pins.

The failsafe and automatic reset block has the dual function indicated. The block is always disposed to blow a fuse and remove power from the drive circuits block so ensuring that the valve solenoids cannot be operated, so that the vehicle retains normal braking.

During normal operation, the failsafe and automatic reset block is continually disabled by the microcomputer. If the microcomputer detects any fault, the microcomputer stops disabling the failsafe and automatic reset block. After a short delay, the automatic reset function reactivates the system. If the microcomputer itself is still functional to some degree it will restart program execution. The microcomputer then enters a self test sequence in which it checks itself and the peripheral circuits. If a problem still exists the microcomputer does not reactivate the failsafe disable signal. The failsafe block waits for an appropriate period of time after initiating automatic reset and if it is not disabled implements the failsafe function i.e. blows the fuse. It is essential that the means by which the micrcomputer disables the failsafe block should not be activated erroneously, i.e. it should not be activated as a result of any failure within the microcomputer itself.

The automatic reset is required because under severe electrical noise conditions the microcomputer could err in its instruction decoding. Program execution can then fall out of synchronisation and the microcomputer's response cannot be predicted. The automatic reset gives the system an opportunity to recover from this situation. The two functions i.e. automatic reset and failsafe are integrated on the same block because the same circuitry actually implements both functions.

A warning lamp is also provided in the system. The lamp illuminates when a problem occurs with the system. As a warning system check the lamp briefly illuminates on start up of a correctly functioning system.

An electromagnetic interference suppression circuit (marked EMI) is incorporated in the signal conditioning and power supply blocks.

Figure 10:
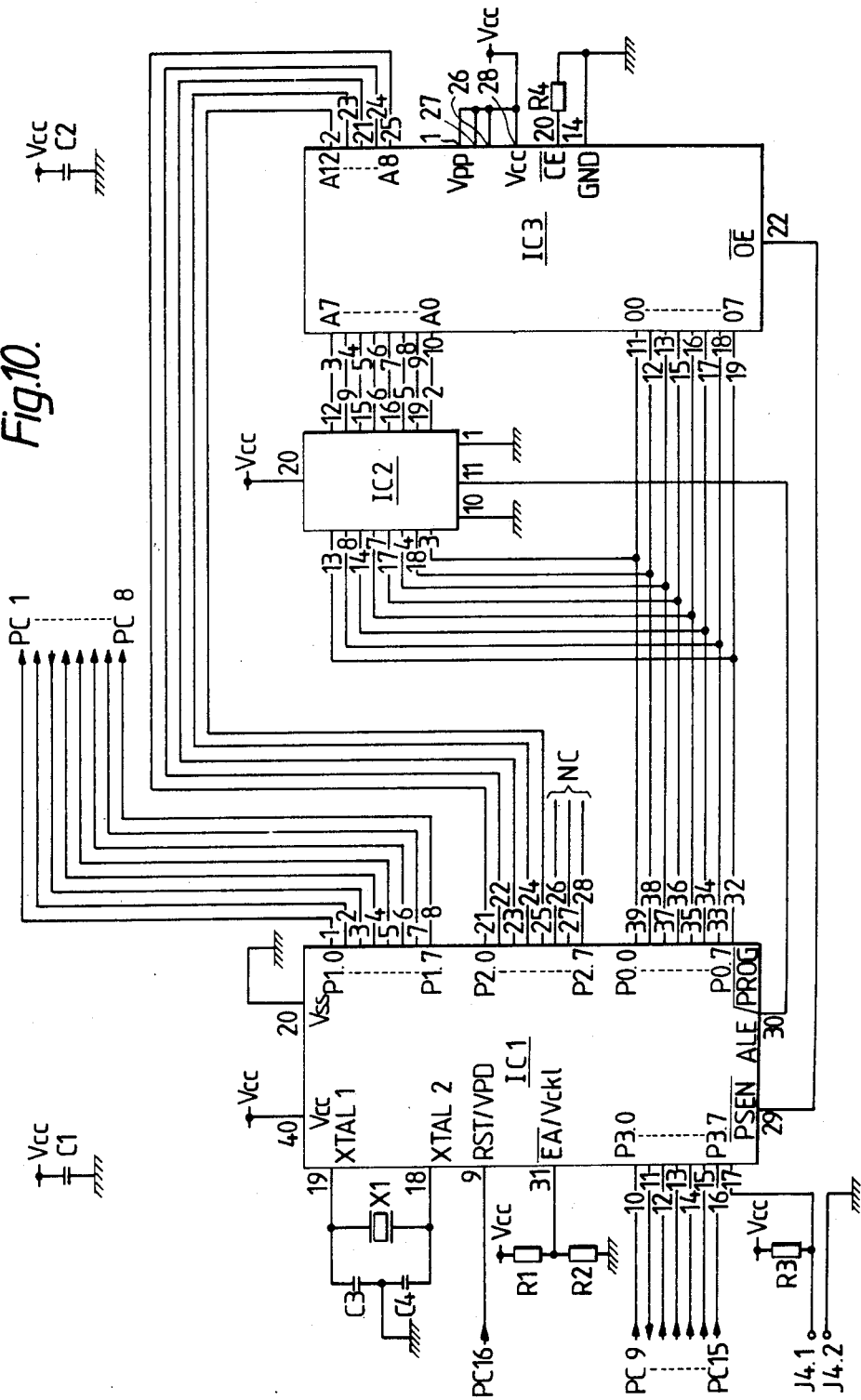
FIGS. 10 to 13 are schematic views of the electronics main board of the electronic control unit.

The microcomputer section of the circuit is shown in FIG. 10. IC1 is the microcomputer itself which contains the central processing unit, 128 bytes of RAM and the various input/output ports. It does not contain any ROM. The microcomputer may be an Intel TP 8031 AH or an MHS IP 8031.

The ROM is in the dedicated memory IC3 which usually is a 2732 A EPROM which contains 4K of ROM. A 2764 memory could also be used which contains 8K of ROM, 4K being redundant.

IC2 is a latch which holds address information. This is needed as P0.0 to P0.7 is a time multiplexed byte-wide bus which transmits address information and receives data back from IC3. The higher order address lines are P2.0 to P2.4; these are not multiplexed and so do not need a latch.

FIG. 10 shows two resistors R1 and R2. In the embodiment described R1 is not used. However if a microcomputer is used which contains internal ROM then R1 is fitted in place of R2. This causes the microcomputer to take its instructions from the internal ROM.

J4 is a jumper arrangement which enables P3.7 to be pulled to ground, so as to energise a self test program which is used during production test and burn-in.

X1 is the crystal which provides the precise clock for the microcomputer. An 8 megahertz frequency is used which gives adequate processing speeds for the application. IC1 is capable of running at 12 Megahertz, however, the speed reduction gives a good safety margin and also means that a slow EPROM can be specified for IC3. The benefit of such an arrangement is that fast access time is difficult to achieve at −40° C. which is the lowest temperature at which the system is required to work.

The resistor R4 is unusual in that it enables the chip enable output of IC3 to be pulled high, thus IC3 can be disabled. Therefore a test technician can distinguish between a faulty microcomputer IC1 and a faulty EPROM IC3.

In the embodiment described, two wheel sensors and three solenoid valves are allowed for in addition to a warning light drive. The ECU is designed so that it may be used in either a prime mover application (FIG. 8) or a trailer application (FIG. 9). In the former case a single axle is usually controlled with sensing from the two wheels of that axle. In the latter case one, two or three axles are controlled depending on whether it is a single axle, tandem or a triaxle trailer. In all cases two wheels of one particular axle are normally sensed.

Figure 8:
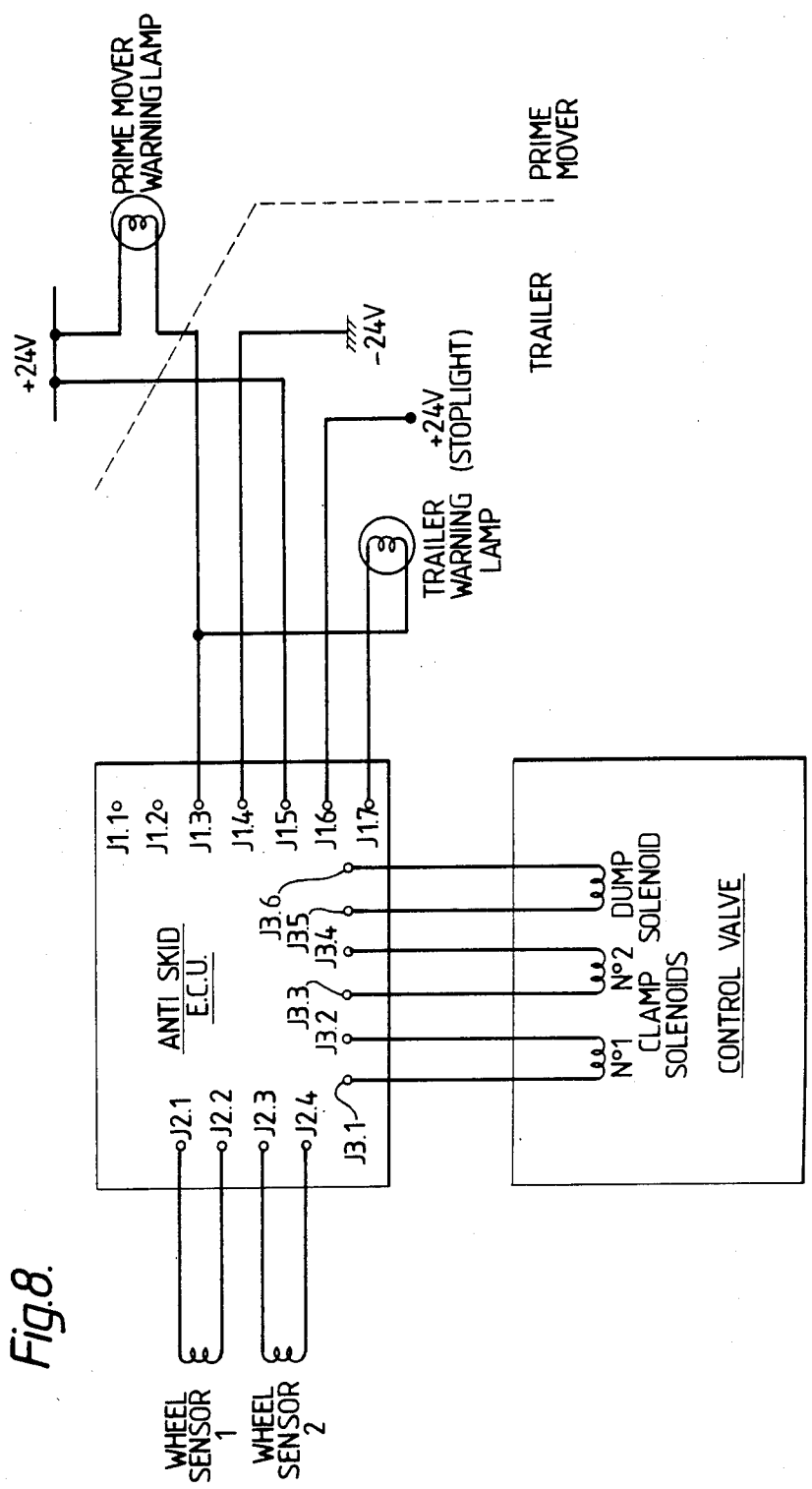
FIG. 8 is a schematic view of the electrical connections of the electronic control unit for use on a prime mover.
Figure 9:
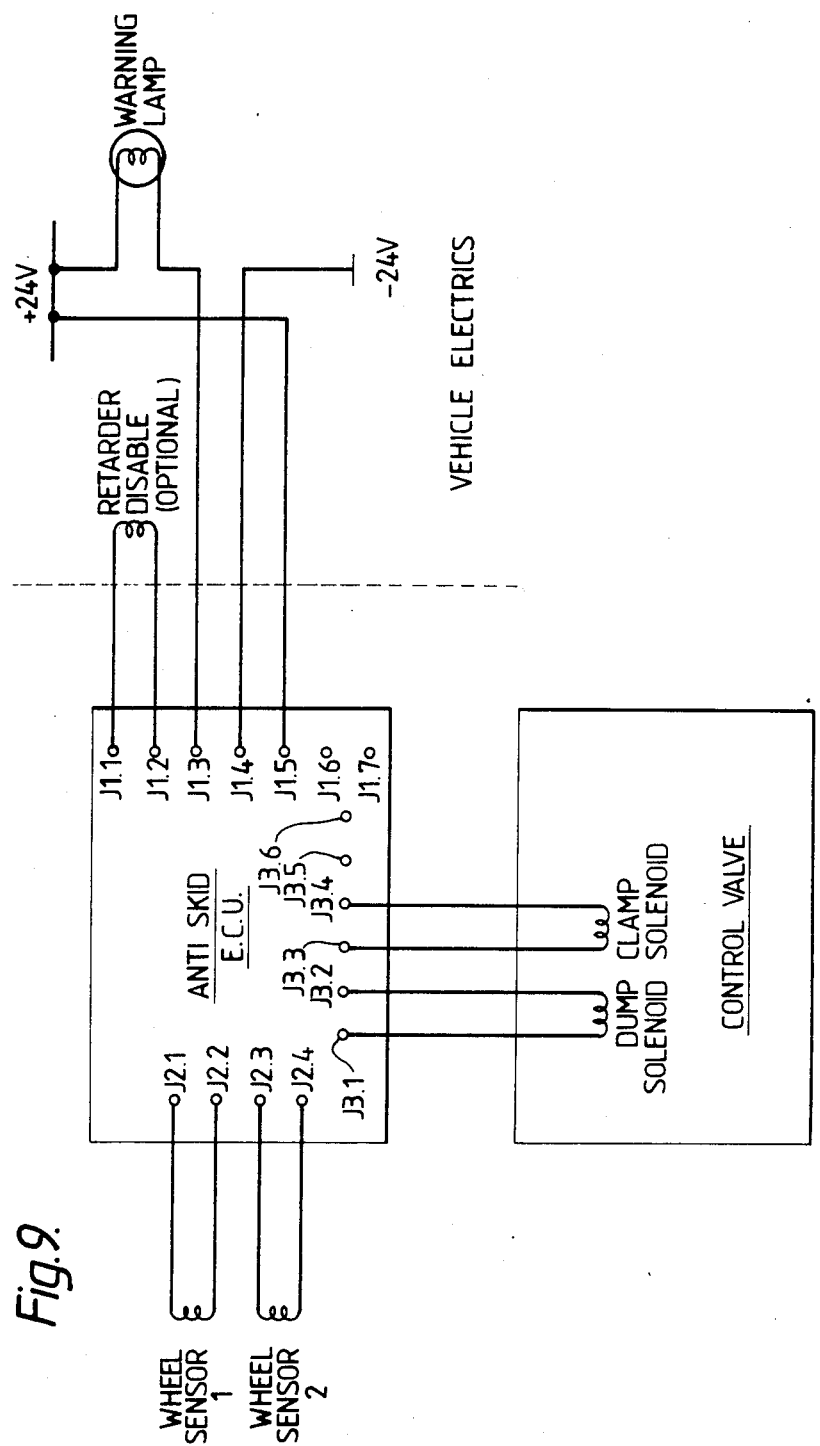
FIG. 9 is a schematic view of the electrical connections of the electronic control unit for use on a trailer.

In FIGS. 8 and 9 it will be noted that three solenoid drives are on connector J3. The three drives are on lines 1 and 2, lines 3 and 4, and lines 5 and 6 respectively. Lines 5 and 6 of J3 are also on connector J1 at lines 1 and 2. In the prime mover application, only two solenoids are required for the control valve. Thus J3 lines 5 and 6 are unused. J1 lines 1 and 2 may then be used for retarder control, see FIG. 9. A retarder is an electromagnetic type brake which can be fitted to a vehicle drive shaft to give check-braking without having wearing parts of any kind. Some retarders can reduce wheel speed well below vehicle speed and ideally should be controlled by an anti-skid system.

Figure 11:
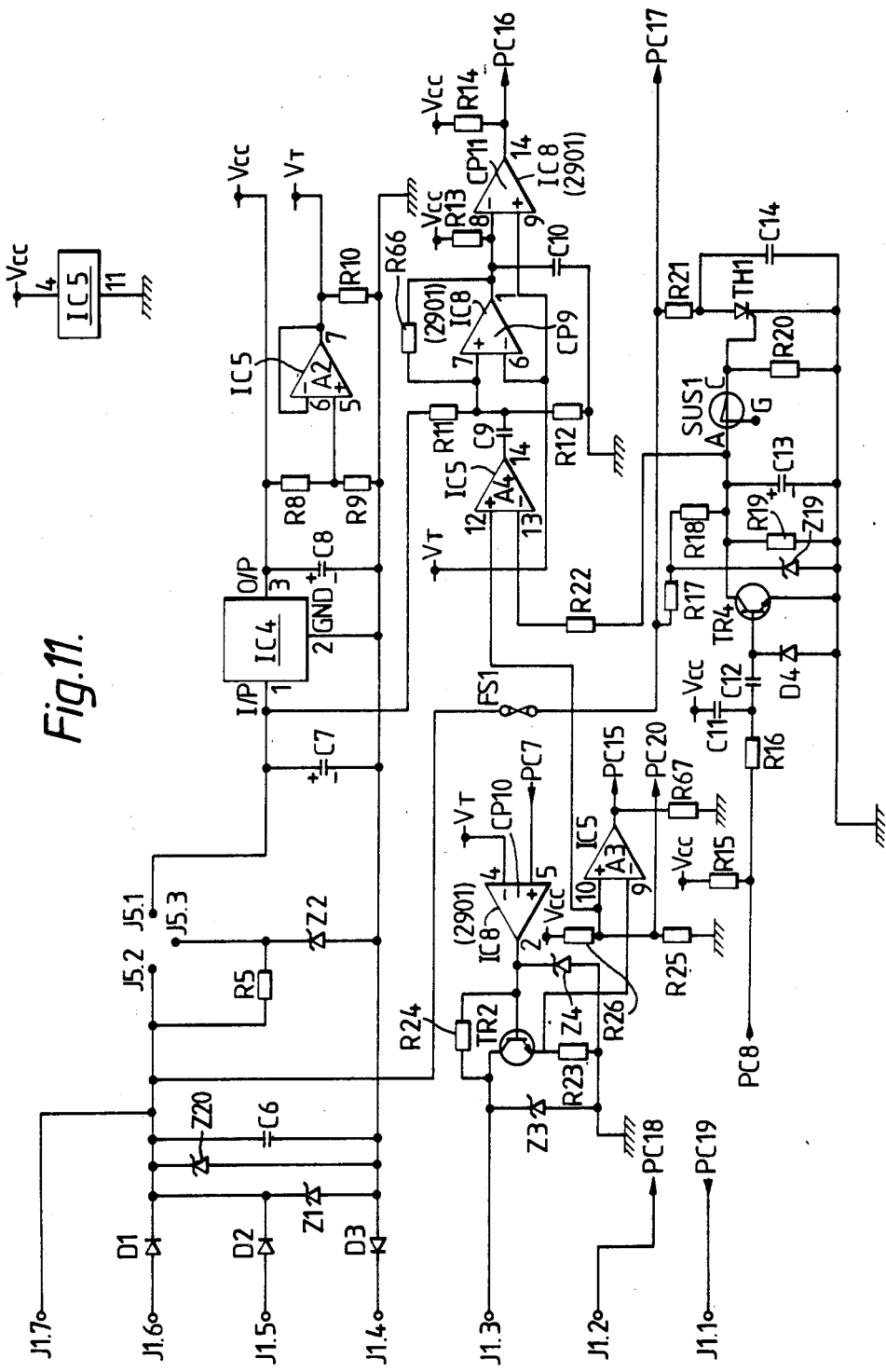

The design of the power supply section is such that the ECU may be powered by two different nominal 24V supplies as shown in FIG. 9. Power is inputted through J1 lines 5 and 6. Referring to FIG. 11, diodes D1 and D2 provide isolation between the two supplies. This isolation is required because in the trailer application the system is required to work from the stop light supply which may be the only supply available on a trailer during braking. If a prime mover is suitably wired, however, a permanent supply is also available and the anti-skid ECU is powered from this supply also.

Diode Z1 and capacitor C6 help to suppress transients. Diodes Z1 and Z20 are 200 V breakdown Zener diodes which clip very high voltage short duration spikes. The load dump transient which can last some hundreds of milliseconds is normally less that 200 V therefore Z1 and Z20 do not conduct. If Z1 and Z20 did conduct they would be destroyed. Thus some means must be provided to protect the circuit up to 200 V. This protection is achieved using transistor TR13 which is mounted off the main board on a heat sink (see FIG. 14). TR13 protects the main regulator IC4 (see FIG. 11) by limiting the voltage at connector J5 line 1 to approximately 9.0 V. Note that J5 lines 1, 2 and 3 are connected to J6 lines 1, 2 and 3 respectively. TR13 also enables the system to work over the voltage range of 16 V to 36 V. IC4 which is a simple 5 V regulator is required to give approximately 300 milliamps at 5 V. At high input voltages, heat is dissipated mainly by TR13 leaving a light load on IC4.

VT is a threshold voltage (1.6 V) generated radiometrically from Vcc. It is used at various points throughout the circuit. CP9 and CP11 and surrounding associated circuitry constitute the initial reset function. If the regulator IC4 is operating correctly, Vcc becomes established within the limits 4.8 V to 5.2 V which is within the allowed working range for the rest of the circuitry (4.75–5.25 V). Both CP9 and CP11 are part of IC8 which is an LM2901N comparator. At the point Vcc becomes established the input to IC4 (pin 1) will be such that pin 7 of CP8 is below pin 6 of CP8. The voltage level of pin 1 on IC4 continues to rise until pin 7 of CP8 goes above the voltage level on pin 6. At that stage CP8 switches positive. As it is an open collector output, pin 1 rises slowly with a time constant determined by resistor R13 and capacitor C10. After a short delay, pin 8 rises above pin 9 on CP11 which then switches negative. The microcomputer then starts functioning. The delay in commencing operation of the microcomputer is necessary so that the microcomputer can start up and begin running. When the input voltage falls, the resistor R13 and capacitor C10 time constant no longer applies. Therefore C10 is discharged immediately by the open collector output. Thus the microcomputer is immediately reset. The positive reset pulse from CP11 is always long enough to reset the microcomputer.

Figure 5:
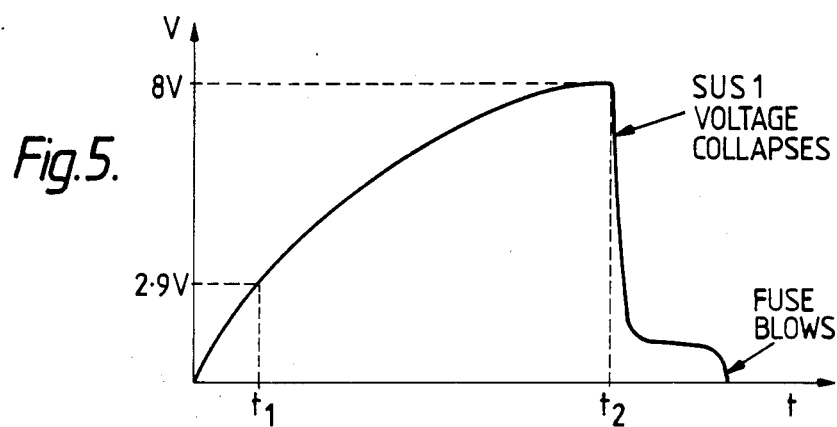
FIGS. 5 to 7 are plots of voltage against time for components of the electronic control unit.

The failsafe and automatic reset block will now be described again with reference to FIG. 11. When power is applied to the system, capacitor C13 charges through resistor R17 and R18 and fuse FS1. If the voltage across capacitor C13 reaches approximately 8 V, then the voltage on silicon unilateral switch SUS1 collapses thus triggering thrysistor TH1. A silicon bilateral switch may also be used in place of the silicon unilateral switch. The resistor R21 limits the current to a safe value so that thrysistor TH1 does not fuse. The current would however fuse FS1 which cuts off power to the drive circuits on PC17. In the normal course of events, transistor TR14 keeps capacitor C13 discharged. Transistor TR4 is biased on by a pulsed input from the microcomputer and line PC8. Resistor R16, capacitor C11, capacitor C12 and transistor TR4 act as a bandpass filter so that the input pulses must occur at approximately design frequency which is 200 Hertz. If for any reason the microcomputer stops pulsing PC8, the voltage on capacitor C13 rises to approximately 2.9 V. At this point, pin 14 of operational amplifier A4, which is part of IC5, goes negative and a reset pulse is sent to the microcomputer through CP11 and CP9 in the usual way. If the microcomputer still does not respond by pulsing PC8, then the voltage on capacitor C13 continues to rise until silicon unilateral switch SUS1 triggers thrysistor TH1 and blows the fuse FS1. The graph shown on FIG. 5, which shows the voltage rise on capacitor C13 and the two trigger points, explains this phenomenon. Although automatic reset and failsafe are separate functions, in the embodiment described they are combined on the same circuit. The microcomputer itself is an integral part of the failsafe function as the microcomputer checks out both itself and also the rest of the circuitry.

Referring to FIG. 11 again, comparator CP10 which is part of IC8, takes a signal from the microcomputer on PC7 to switch on the warning light. It should be noted that transistor TR2 is current limited by resistor R23 and also the microcomputer is alerted to the current limit through operational amplifier A3 and PC15. At this stage the microcomputer switches off transistor TR2 because as transistor TR2 has no heat sink it cannot remain in active current limit for an extended period. A further feature of the lamp drive circuit is that transistor TR2 sinks current in the absence of a contrary signal from comparator CP10, i.e. if the ECU is unpowered the warning light will still illuminate.

In addition, the warning light drive may be used to output diagnostic information. Brief pulses, whose frequency or pattern correspond to particular faults, may be superimposed on this line. These pulses are too short to be seen visually on the warning lamp and so don't confuse the driver. The information may be extracted however by looking at the pulses with an oscilloscope or by using a dedicated piece of test equipment. The advantage of using the warning light drive is that a separate drive is not required. In practice the warning light bulb is located in the dash or on the trailer headboard and may be removed to allow the test equipment to be plugged in. The particular type of fault i.e. faulty sensor, faulty solenoid, etc. will be indicated to the service engineer.

Figure 6:
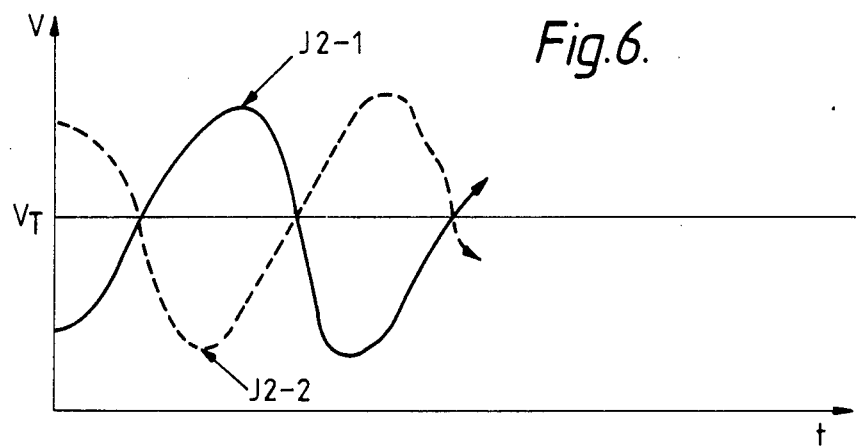
Figure 7:
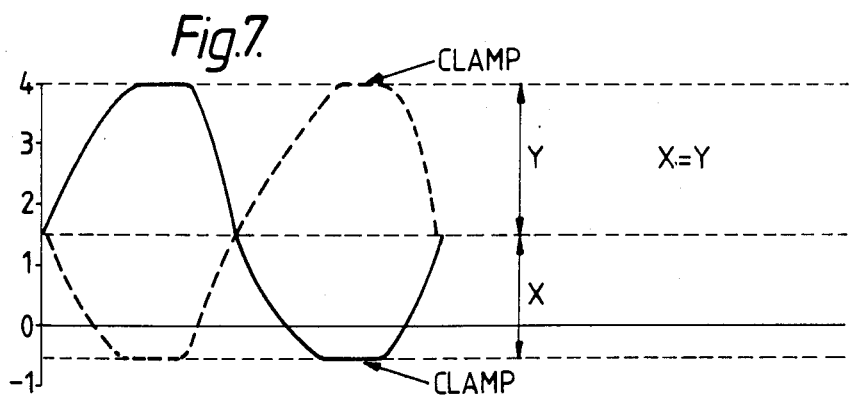
Figure 12:
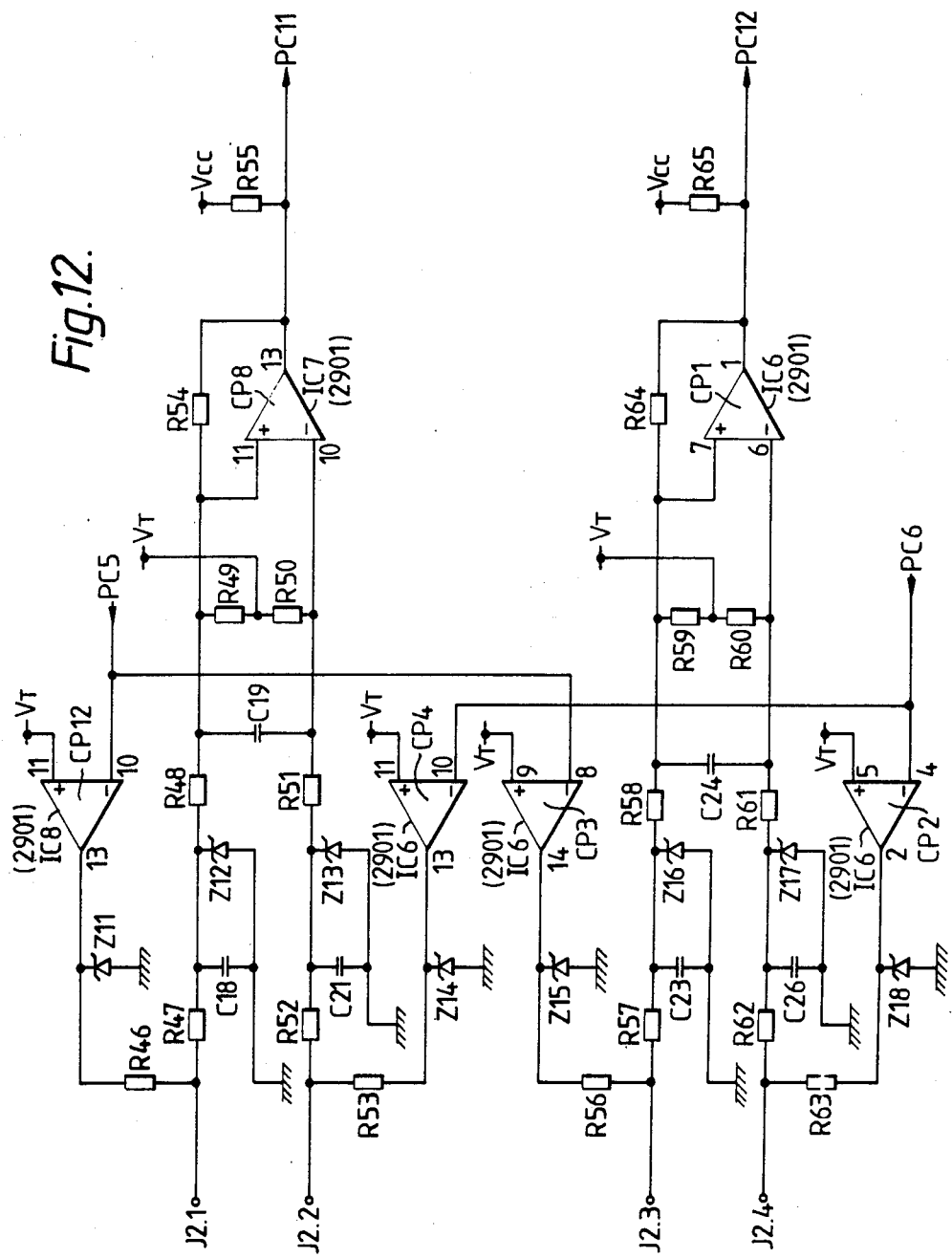

Referring now to FIG. 12, two identical signal conditioning blocks corresponding to the two sensors are shown. The block corresponding to sensor connections J2 line 1 and J2 line 2 will now be considered. During normal operation comparator CP4, which is part of IC6, and comparator CP12, which is part or IC8, both of which are open collector drivers, are switched off. Thus, these comparators and resistors R46 and R53 have no function and do not affect the rest of the circuit. The sensors are connected between J2 line 1 and J2 line 2. Thus an approximate sine wave input appears at these points as shown on FIG. 6. Because of a balanced input two opposite phases are indicated on the graph. This input translates to a differential signal at the input of comparator CP8 which is part of IC7. Resistor R54 provides hysteresis. Thus a square wave appears at the output of comparator CP8 which is fed to the microcomputer. The square wave input provides the period information as described with reference to FIG. 2. Resistor R47, resistor R52, capacitor C18, capacitor C21, resistor R48, resistor R51 and capacitor C19 provide filtering to reject mechanical noise which could corrupt the sine wave. These components also provide a filter for radio frequency interference. Resistor R47, resistor R52, capacitor C18 and capacitor C21 provide common mode filtering while resistor R48, resistor R51 and capacitor C19 provide differential mode filtering. The voltage VT is used to bring the circuit quiescent voltage into the working range for the inputs of comparator CP8. Zener diodes Z12 and Z13 limit the voltage appearing at the input of comparator CP8 under overdrive conditions. The breakdown voltages of Zener diodes Z12 and Z13 are chosen so that under such overdrive conditions resistor R49 and resistor R50 do not tend to shift the threshold voltage level VT. This may be clarified with reference to FIG. 7.

While the microcomputer is receiving a square wave from comparator CP8 it assumes that a sensor is connected and operating correctly. If the microcomputer is not receiving an input however the microcomputer needs to determine whether or not the sensor is connected or if J2 lines 1 and 2 are short circuited. Such investigation is carried out as follows. Resistor R46 and resistor R53 are chosen so that either if pulled to ground by comparator CP12 or CP4, can cause comparator CP8 to switch whether or not the sensor is connected. Thus if resistor R46 is pulled to ground comparator CP8 pin 13 goes low if it was already high. If the pin 13 was low it remains low. Similarly if resistor R53 is pulsed low then comparator CP8 pin 13 goes high if it was already low. If pin 13 was high it remains high. Because of the hysteritic effect of resistor R54, once comparator CP8 switches it holds in the absence of a further stimulus. If however J2 lines 1 and J2 lines 2 are shorted together then comparator CP8 cannot switch under stimulation from comparator CP12 or comparator CP4. This is because with the shorted input, only a common mode signal may be applied to comparator CP8.

The microcomputer also is required to check if the sensor is disconnected. To implement this test, comparator CP12 first pulses resistor R46 low, thus switching comparator CP8 low. After a settling period, resistor R46 and resistor R53 are pulsed low together. As resistor R53 has a lower resistence value than resistor R46 there is a tendency for comparator CP8 to switch high as the "pull" on point J2 line 2 is stronger. Resistor R46 and resistor R53 are chosen so that the difference will overcome the hysteritic effect of resistor R54 if the sensor is not connected between J2-1 and J2-2, but not if it is connected. Thus, if the sensor is connected comparator CP8 remains low and this difference is picked up by the microcomputer which can respond accordingly and light the warning lamp.

The additional components required to implement the self-check are comparator CP12, comparator CP4, resistor R46, resistor R53, Zener diode Z11 and Zener diode Z14. Zener diode Z11 and Zener diode Z14 protect comparator CP12 and CP4 from high voltages on J2 line 1 and/or on J2 line 2. Zener diode Z12 and Zener diode Z13, which are part of the main circuit, are also required for protection.

As well as a check on whether or not the sensor is connected, the arrangement allows the input circuits themselves to be tested. If J2 line 1 and J2 line 2 are not shorted comparator CP8 can be toggled by pulsing comparator CP12 and CP4 alternately. This is part of the self-test procedure both in production and after installation.

Figure 13:
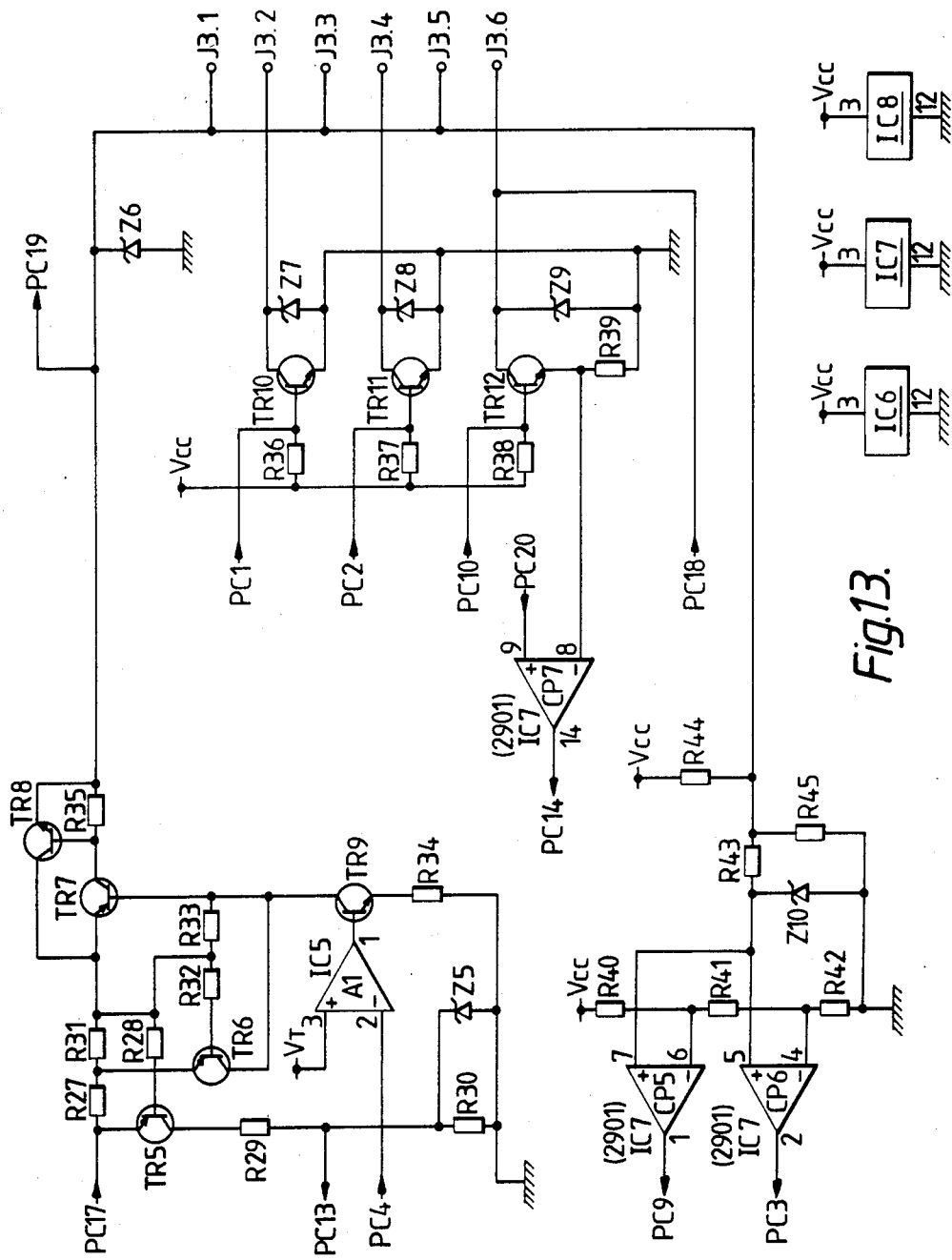

The drive circuits and load dump protection block are shown on FIG. 13. Considering the circuit subblock comprising transistors TR5, TR6, TR7 and TR8, operational amplifier A1, which is part of IC5, transistor TR9 and associated circuitry. The plus 24 V supply comes in at PC17 which is the fused power line which will be dead if the fail safe mechanism has blown fuse FS1. Transistors TR7 and TR8 form a PNP-NPN series-pass transistor arrangement. Normally, transistor TR7 is held on by transistor TR9; thus transistor TR8 also is on and passes current to supply the solenoids through connector J3 on lines 1, 3 and 5. Transistor TR9 is under microcomputer control through operational amplifier A1 and so can switch off transistor TR8. The current flowing through transistor TR8 also passes through resistor R27 and resistor R31 and so turns transistor TR5 on when it reaches a preset limit (0.8 amps approx). The turning on of transistor TR5 is signalled to the microcomputer through PC13. The microcomputer can switch off transistor TR8 via transistor TR9. Thus the system is protected against short circuits from connector J3 lines 1, 3 or 5 to ground. When more than one of the solenoids of the control valve is switched on at the same time, the 0.8 A limit will be exceeded. The microcomputer is programmed to ignore the PC13 signal under these circumstances, i.e. when more than one of transitors TR10, TR11 and TR12 are switched on at the same time.

The above mechanism also operates if a load dump, for example a 150 V pulse, appears on PC17. If this happens, Zener diode Z6 conducts and the current limit is again exceeded, so activating transistor TR5. A higher hard current limit is also present (approximately 1.8 amps). This hard current limit activates through transistor TR6 and protects transistor TR8 from excessive instantaneous currents, whether under load dump or external short circuit conditions. The additional protection mechanism is necessary as the microcomputer may not respond immediately. However this mechanism is not sufficient on its own as transistor TR8 would overheat if left in current limit mode for an extended period. Transistors TR5, TR6, TR7, TR8 and TR9 are all high voltage transistors, rated to withstand load dump voltages up to 200 V. These transistors are protected from higher voltage low energy transients by Zener diode Z1 as already described. The arrangement of resistors R27 and R31, transistors TR7 and TR8 is chosen to minimise the voltage drop in the line. PC19 eventually connects to J1 line 1 which provides the positive 24 V supply for retarder control. Transistors TR10, TR11 and TR12 are the three drive transistors. In the prime mover application, transistors TR10 and TR11 only are used for driving the valve control solenoids. These transistors sink the solenoid current to ground. It should be noted that no current limit protection is provided as the supply to these solenoids through J3 line 1 and J3 line 3 is already current limited. It should also be noted that the connections to these solenoids are within the anti-skid unit itself in the particular application and so could not be accidently connected to a 24 V supply which is not current limited.

Transistor TR12, however, is also used for sinking the retarder control signal through J1 line 2. As the wiring goes into the vehicle electrics a wrong connection may be effected during installation and so current limiting is required. The current limiting is provided by resistor R39. This protection of itself is not adequate as transistor TR12 would overheat if left in active current limit. Thus the microcomputer is signalled through comparator CP7 of the current limit situation and can switch off TR12. In the trailer application, transistor TR12 drives the third solenoid directly through J3 line 6.

Comparators CP5 and CP6 provide a check on the solenoid connections and also are an integral part of the failsafe system. In the normal course of events, transistor TR8 is switched off, as are transistors TR10, TR11 and TR12, thus ensuring that there is no electrical supply to the solenoids thereby ensuring that the vehicle is left with normal braking. In this condition J3 line 5, J3 line 3 and J3 line 1 are effectively open circuit and so this line is held at approximately 2.5 V by resistor R45 and resistor R44. Thus PC3 is high and PC9 is low. When transistor TR8 is switched on, PC9 goes high also. Transistor TR8 is pulsed periodically to ensure that both transistor TR8 and the diagnostic system are working properly.

Transistors TR10, TR11 and TR12 are checked periodically to ensure that they are operating correctly. Transistor TR8 is first switched off. Then transistors TR10, TR11 and TR12 are pulsed in sequence. In such a case comparator CP6 is pulsed low indicating that the three drives are working properly. This procedure also checks if the solenoids are connected. If they are not, then comparator CP6 will not respond when that particilar solenoid is pulsed. If a problem is found with transistors TR10, TR11 and TR12, then these transistors are switched off or at least an attempt is made to switch them off and the system relies on transistor TR8 which is tested periodically in the manner described. The transistor TR5 curent limit is also important here. If J3 lines 1, 3 and 5 are open circuit then the response to transistor TR8 operation is through comparator CP5, if J3 lines 1, 3 and 5 are short circuited to ground however then the response is picked up through the transistor TR5 current limit. Finally if a problem is found with transistor TR8, then the discreet failsafe circuit is activated and fuse FS1 blows.

While the invention has been described in detail above, it is to be understood that this detailed description is by way of example only and the scope of protection granted is to be limited only within the spirit of the invention and the scope of the following claims.

What is claimed is:

1. An electronic control unit for an anti-skid braking system; said braking system including control valve means adapted to control a vehicle's brakes and means to sense the speed of the vehicle's road wheels, signal conditioning means to generate signals based on the speed of said vehicle's road wheels as sensed by said sensing means, microcomputer means programmed to determine control signals for said valve means, means to deliver said conditioned signals to said microcomputer means; drive means to deliver said control signals from said microcomputer means to said control valve means, failsafe means to disable said drive means so arranged as to normally disable said drive means to thereby normally prevent said drive means from delivering said control signals from said microcomputer means to said control valve means, means to normally deliver a disable signal from said microcomputer means to said failsafe means; whereby during normal operaton of said unit said microcomputer's control signals are delivered via said drive means to said control valve due to said disable signals from said microcomputer holding said failsafe means effectively disabled from preventing said drive means from so delivering said microcomputer control signals; and said microcomputer means including means to periodical pulse said failsafe means to thereby normally prevent said microcomputer means from enabling said failsafe means to disable said drive means.

2. An electronic control unit as claimed in claim 1 and test circuitry between the microcomputer and the drive means with the microcomputer being programmed to implement a self check procedure.

3. An electronic control unit as claimed in claim 1, in which the failsafe means includes resetting means and a fuse and which during operation of the electronic control unit is continuously disposed to blow the fuse so as to prevent operation of the anti-skid braking system, the failsafe means being pulsed periodically by the microcomputer means so as to prevent the fuse from blowing, whereby on detection of a fault the pulsing is stopped, the microcomputer resetting means is activated and the fuse is blown if the pulsing of the failsafe means does not recommence within a set time.

4. An electronic control unit as claimed in claim 3 in which the failsafe means includes (1) a capacitor which is continuously discharged by pulses from the microcomputer means, the pulses being within a range of design frequencies and (2) a band pass filter for preventing pulses of other frequencies from discharging the capacitor.

5. An electronic control unit as claimed in claim 1, in which the microcomputer means includes a comparator associated with the signal conditioning means; and the comparator, when pulsed alternatively from a source corresponding to each of two sensor leads and then simultaneously from both sources, including means to inform the microcomputer whether any of said sensors are disconnected or short circuited.

6. An electronic control unit as claimed in claim 1, including load dump protection means which protects the unit from large electrical transients which may suddenly be introduced into the electrical supply of the unit.

7. An electronic control unit as claimed in claim 1, including means for suppressing electromagnetic interference.

8. An electronic control unit as claimed in claim 1, including a warning light drive which may additionally be used to output diagnostic information for indicating the type of fault which may exist in the anti-skid braking system.

9. An electronic control unit as claimed in claim 1, said sensing neans comprising two sensing devices for each axle of said vehicle, including a comparator associated with said conditioning means and means for pulsing said comparator both alternatively and simultaneously from a source corresponding to each of said two sensing devices for determining whether each such device is disconnected or short-circuited.

10. An electronic control unit as claimed in claim 1, wherein said failsafe means is combined with resetting means, whereby a reset of the microcomputer means is effected to enable restoration of said periodic pulsing if possible before said disablement occurs.

11. An electronic control unit as claimed in claim 10, wherein the resetting means includes a semiconductor device operable to reset the microcomputer when the voltage of the capacitor attains a lower predetermined voltage.

12. An electronic control unit as claimed in claim 1, wherein said disabling means includes a fuse via which the anti-skid control valve means is supplied and a semiconductor device in series with said fuse triggerable by attainment of a predetermined voltage to blow the fuse.

13. An electronic control unit as claimed in claim 1, wherein the microcomputer means is also supplied via said fuse.

14. An electronic control unit as claimed in claim 1, wherein the failsafe means includes a capacitor chargeable via a resistor and dischargeable via a transistor the current in which is dependent upon periodic pulses, whereby interruption of the pulses permits the voltage of the capacitor to progressively rise towards a predetermined voltage.

15. An electronic control unit as claimed in claim 14, wherein said periodic pulses are applied to said transistor via a band pass filter preventing pulses of frequency outside the pass band thereof from discharging the capacitor.

* * * * *